July 12, 1966 H. C. GOHS 3,260,293
THREADED LOCK WASHER
Filed Sept. 3, 1964
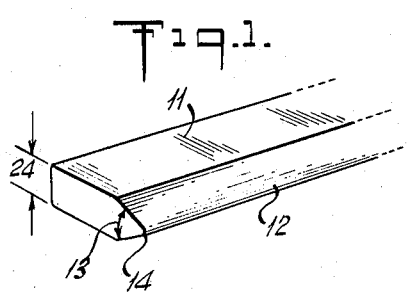
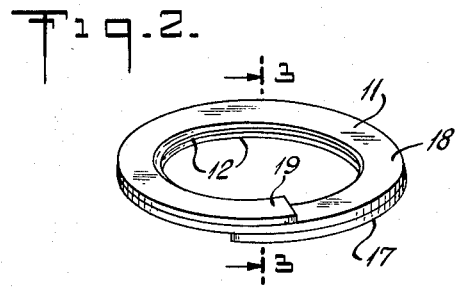
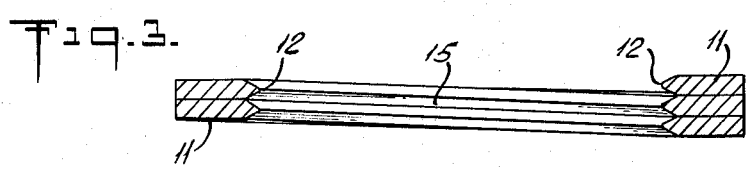
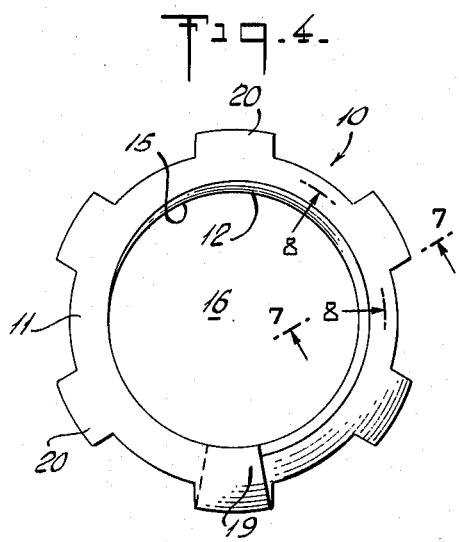
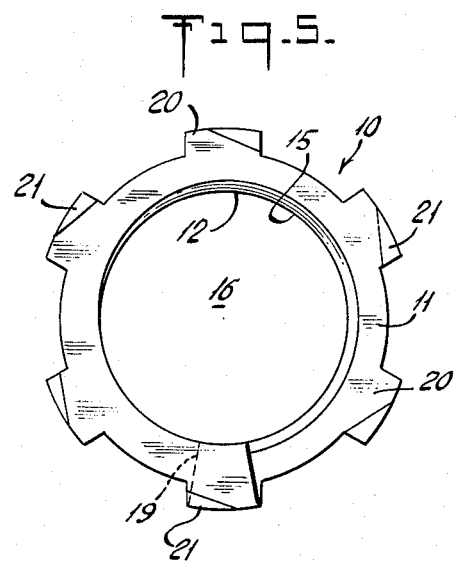
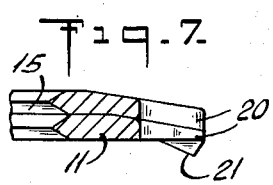
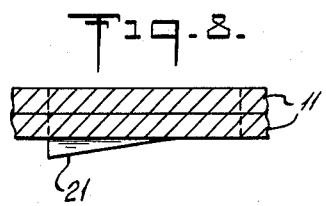
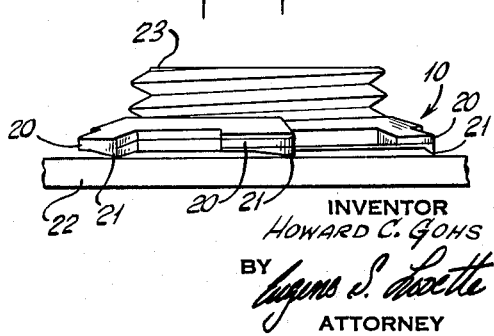
INVENTOR
HOWARD C. GOHS
BY
ATTORNEY 3,260,293
THREADED LOCK WASHER
Howard C. Gohs, Syosset, N.Y., assignor to Electrical Fitting Corporation, East Farmingdale, N.Y., a corporation of New York
Filed Sept. 3, 1964, Ser. No. 394,160
4 Claims. (Cl. 151—37)

This invention relates to a threaded lock washer and, in particular, a threaded lock washer having superior locking action for attaching an electrical fitting to an outlet box, fixture or the like.

Prior art threaded lock washers as contemplated herein are essentially one piece cylindrical bodies having a threaded center hole and spaced gripping tabs along its outer periphery. Such prior art washers are frequently known to work loose after attachment of an electrical fitting to an outlet box or the like.

It is the principal object of the invention to provide an improved threaded lock washer formed essentially by a helix coil of side-by-side turns of flat wire material wound in accordance with a screw thread convolution to form the lock washer having a threaded central opening.

One principal advantage of the invention is that a washer in accordance with the invention does not require a machine operation for cutting a thread; such thread is automatically formed upon winding the lock washer.

As a further advantage, the cost for fabricating a lock washer in accordance with the invention is drastically reduced in comparison to the comparable prior art washer.

As a further advantage, a lock washer in accordance with the invention provides a dual locking characteristic heretofore unavailable in the prior art lock washer, whereby a washer in accordance with the invention is substantially foolproof from working loose after attachment.

Further objects and advantages will become apparent from the following description of the invention taken in conjunction with the figures, in which:

FIG. 1 is a perspective view illustrating the shape of flat wire material employed to form a lock washer in accordance with the invention;

FIG. 2 is a perspective view of the helical coil forming the lock washer;

FIG. 3 is a sectional view taken along line 3—3 of FIG. 2;

FIG. 4 is a plan elevation showing one side of the lock washer;

FIG. 5 is a plan elevation showing the opposite side of the lock washer, that is to say, the side thereof containing the formed biting edges;

FIG. 6 depicts a lock washer in position for fastening an electrical fitting to a fixture or outlet box;

FIG. 7 is a fragmentary sectional view taken along line 7—7 of FIG. 4; and

FIG. 8 is a fragmentary sectional view taken along line 8—8 of FIG. 4.

The figures illustrate an embodiment of a threaded lock washer 10 in accordance with the invention. As depicted in FIG. 1, lock washer 10 is made up of a relatively flat wire body 11 of stock material. Body 11 is substantially rectangular in cross-section, except that one lengthwise edge 12 thereof is beveled. A flat ribbon-like body having one lengthwise beveled edge, as contemplated herein, is available as stock material. The beveled dimension, depicted by reference number 13, is preferably 60 degrees and has a small smoothing radius 14 along its lengthwise apical edge. A 60 degree bevel is selected to provide a standard screw thread. As seen hereinafter, beveled edge 12 forms the lock washer thread 15.

The invention contemplates winding a continuous length of body 11 into a plurality of side-by-side helix turns in accordance with a screw thread convolution to form a cylindrical-circular lock washer having a threaded central opening 16. FIG. 2 illustrates the formed lock washer after winding at least two helix turns 17, 18 of body 11 so that the adjacent turns have their wide faces in substantially contiguous coinciding side-by-side relationship. In the preferred embodiment, washer 10 is constituted by slightly more than two turns; an overlap is depicted at 19 in FIG. 2.

The outer peripheral edge of the coiled turns 17, 18 are provided with a plurality of spaced tabs or toothed serrations 20. The adjacent side-by-side tabs 20 of turns 17, 18 are in contiguous and coinciding relationship. On one side of washer 10, the tab faces are formed with outwardly projecting sharp gripping edges or points 21 for biting into an outlet box or fixture wall 22. Tabs 20 and the edges 21 thereof may be formed by stamping or punching the coiled washer body 11. As known in the art, lock washer 10 is employed to attach a threaded electrical fitting 23 to the wall 22 of a fixture or electrical outlet box or the like. Fitting 23 is depicted in FIG. 6 and might be a coupling connector, a threaded end of conduit or other electrical fitting. For illustrative purposes, the outlet box or fixture wall to which fitting 23 is attached is depicted as 22. The fitting subject to attachment exends through a knock-out hole in the box or fixture wall 22. Lock washer 10 is threadedly advanced along the fitting threads until the gripping edges 21 bear against wall 22. Washer 10 is then driven tight by hammering a screwdriver blade against one of the tabs 20 to drive further washer 10 as a right-hand screw member hard against wall 22. This action causes washer edges 21 to bite into wall 22.

The rear side of washer 10, as shown in FIG. 4, is relatively smooth. The abutting side-by-side faces of the coinciding tabs 20 of adjacent washer turns 17, 18 are also relatively smooth to allow one helix turn to rotate slightly with respect to the other when washer 10 is tightened. In stamping out tabs 20, the side of washer 10 including edges 21 is slightly arched with respect to a plane perpendicular to the axis of its central opening 16, for example, the plane of wall 22. The tab biting edges 21 are formed to lie in the same plane of wall 22 so that all the edges 21 preferably strike wall 22 simultaneously as washer 10 is brought to bear against such wall for tightening.

When washed 10 is driven tight against wall 22, two spring-locking actions occur. Washer edges 21 bite hard against the fixture wall 22, whereby the resiliency of the arched washer tends to straighten same causing washer 10 to assume a posture under spring force parallel to the plane of wall 22. This action resiliently loads the washer threaded connection with fitting 23 with a back pressure to create a very tight grip therebetween. Simultaneously, the helix turn of washer 10 actually bearing against wall 22 stops turning when its edges 21 bite into the wall. As the tightening pressure is continued on washer 10, the rear helix turn of the washer tends to unwind slightly as it continues slight turning as a right-hand screw member with respect to the first washer turn. The foregoing action provides in effect a second lock washer engagement, which in combination with the first threaded locking action provides a positive lock essentially foolproof against accidental detachment. The effect is somewhat like two side-by-side lock washers being tightened up for locking a threaded member to a box wall. The prior art lock washer does not provide such a positive locking action.

In fabrication of washer 10, body 11 is turned so that beveled edge 12 forms the threaded bore of washer central opening 16. Since turns 17, 18 constituting washer 10 are formed in accordance with a screw thread convolution, the wound beveled edge 12 automatically provides a threaded central opening 16 without requiring further machining to form threads 15. Body 11 is turned with the same diameter and pitch as the threads of the fitting to be fastened thereby; such threaded fitting generally have standard threads.

Stock flat wire made of SAE 1010 cold roller steel may be used as the material for body wire 11. This material is sufficiently soft and resilient to allow coiling of body 11 in a manner described herein without distortion setting in as a result of fabrication to assure retention of the coiled lock washer threads 15.

The thickness of body 11, shown as dimension 24 in FIG. 1, may be in the order of .05 inch to provide a two turn washer 10 in the order of .10 inch thick. Overlap 19 is approximately the length of a tab 20, whereby three layers of tabs 20 appear only at the region where the coiled washer begins and ends. Tabs 20 are located at this overlapping region of the illustrated embodiment.

The invention also allows approximately a 75 percent reduction in cost of material used to form a lock washer 10 in accordance with the invention in comparison to the cost of material used in forming the prior art washer. A further advantage of the invention is provided by the fact that no thread machining operation is required in making the lock washer, since the coiled washer automatically forms its thread.

The prior discussion teaches that washer 10 may be coiled out of a flat stock wire material having a lengthwise beveled edge. It will be understood that washer 10 may be stamped out of sheet metal of suitable thickness 24, for example .05 inch thick. This is accomplished by stamping out preselected lengths of such sheet metal having one lengthwise edge thereof stamped with a bevel, as shown in FIG. 1, and then coiling the flat material as described hereinbefore to provide lock washer 10 with a threaded central bore 16. The use of sheet metal further reduces the material cost of lock washer 10 in comparison to making same out of a flat wire stock material.

It is intended that all matter contained in the above description or shown in the accompanying drawings shall be interpreted as illustrative and not in a limiting sense.

What is claimed is:

1. A threaded lock washer comprising a plurality of turns of continuous lengthwise material forming a circular lock washer having a central opening, said turns being wound side-by-side in accordance with a screw thread convolution, said turns abuting each other but being free for slight relative sliding movement, the lengthwise edge of the material forming the bore of said central opening having a beveled V-shaped edge to provide a screw thread along said opening, and a series of tabs extending radially from the outer periphery of said turns and being extended past the end one of said turns to provide biting edges at an angle with respect to a plane perpendicular to the axis of said central opening.

2. A threaded lock washer in accordance with claim 1 wherein the biting edges of said tabs project axially beyond the end turn of said lock washer and each of said tabs includes a tool-striking edge.

3. A threaded lock washer comprising a plurality of turns of continuous lengthwise material forming a circular lock washer having a central opening, said turns being wound side-by-side in accordance with a screw thread convolution, said turns abutting each other but being free for slight relative sliding movement, the lengthwise edge of the material forming the bore of said central opening having a beveled V-shaped edge to provide a screw thread along said opening, and a series of toothed serrations extending radially from the outer periphery of said turns, each of said toothed serrations having an abutment for causing the lock washer to turn around a threaded member when struck thereat and a biting edge which projects axially beyond the end turn of the washer.

4. A method for forming a threaded lock washer comprising the steps of:
 (1) winding a continuous length of material having a lengthwise V-shaped beveled edge into a plurality of side-by-side abutting but relatively slidable turns in accordance with a screw thread convolution to form a circular lock washer having a central threaded opening, and
 (2) forming a series of tabs extending radially from the outer periphery of the turns and bent at an incline with respect to a plane perpendicular to the axis of said central opening, said tabs thus projecting axially beyond the end turn of the lock washer.

References Cited by the Examiner

UNITED STATES PATENTS

| | | | |
|---|---|---|---|
| 1,749,600 | 3/1930 | Olson | 151—37 |
| 2,387,257 | 10/1945 | Hass. | |
| 2,407,879 | 9/1946 | Hass. | |
| 2,439,687 | 4/1948 | Findley. | |
| 2,464,808 | 3/1949 | Hattan. | |
| 2,687,757 | 8/1954 | Appleton | 151—37 |

EDWARD C. ALLEN, *Primary Examiner.*